Giles B. Roe.
Water-Driver.
No. 121,731.  Patented Dec. 12, 1871.
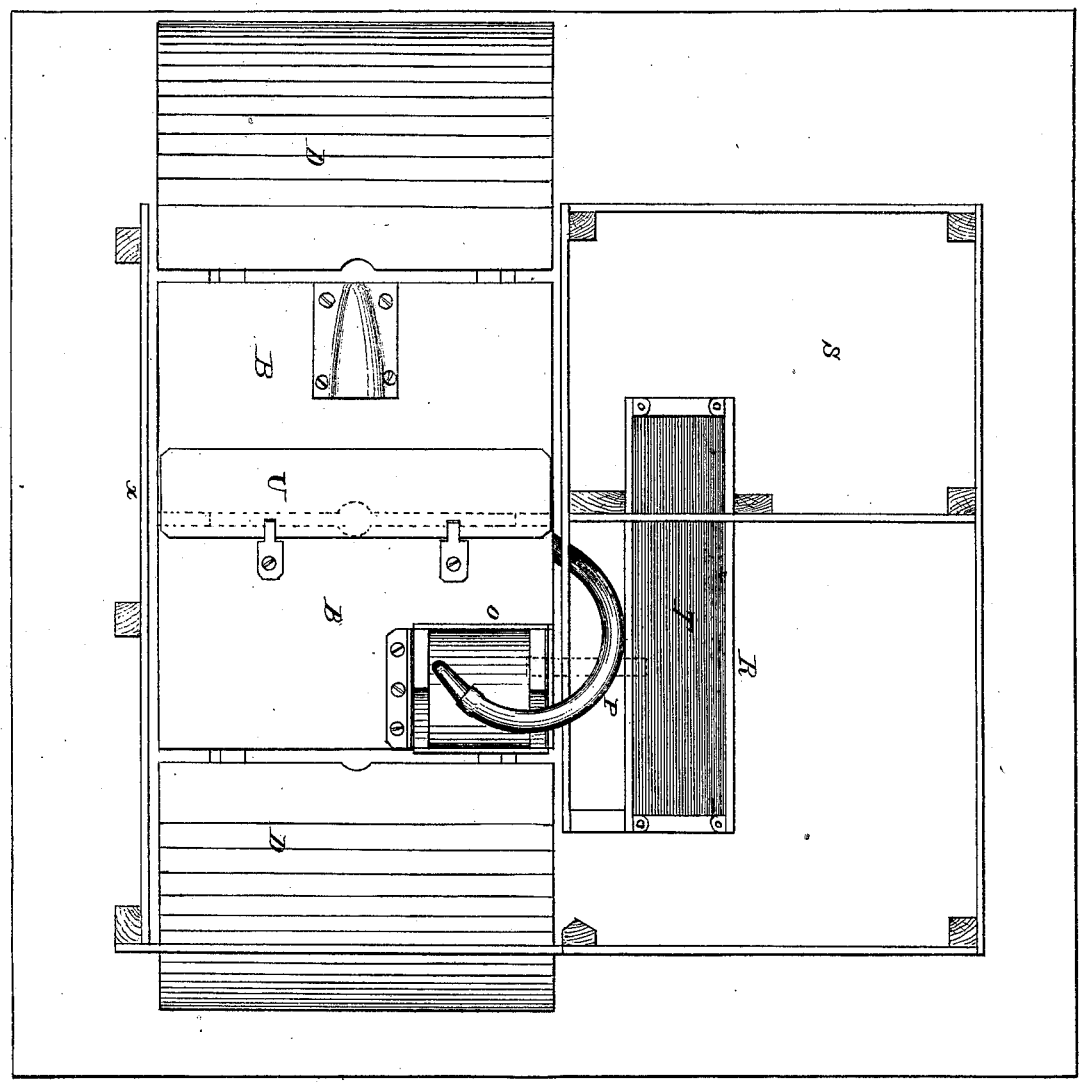
Attest
Inventor:

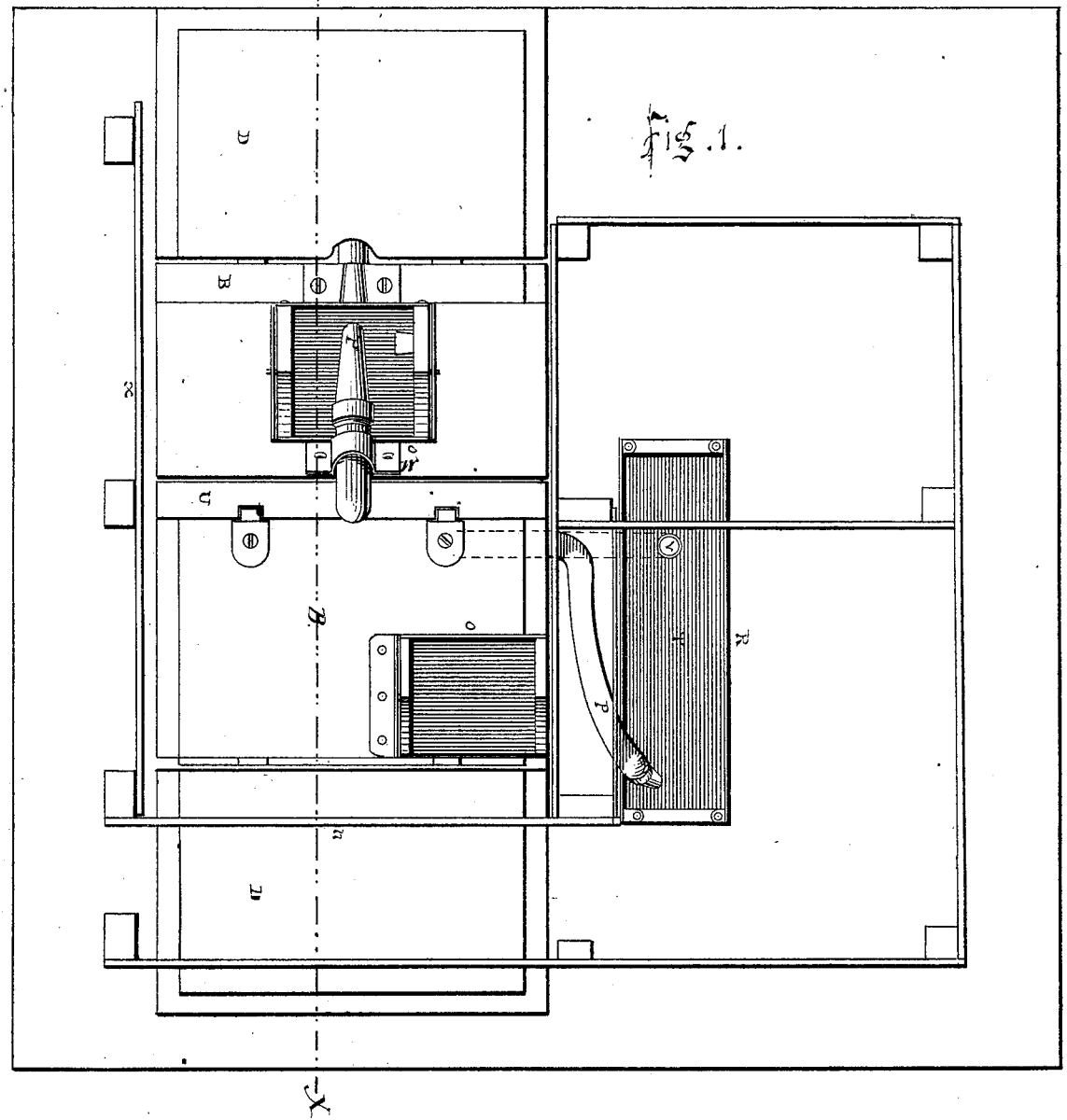

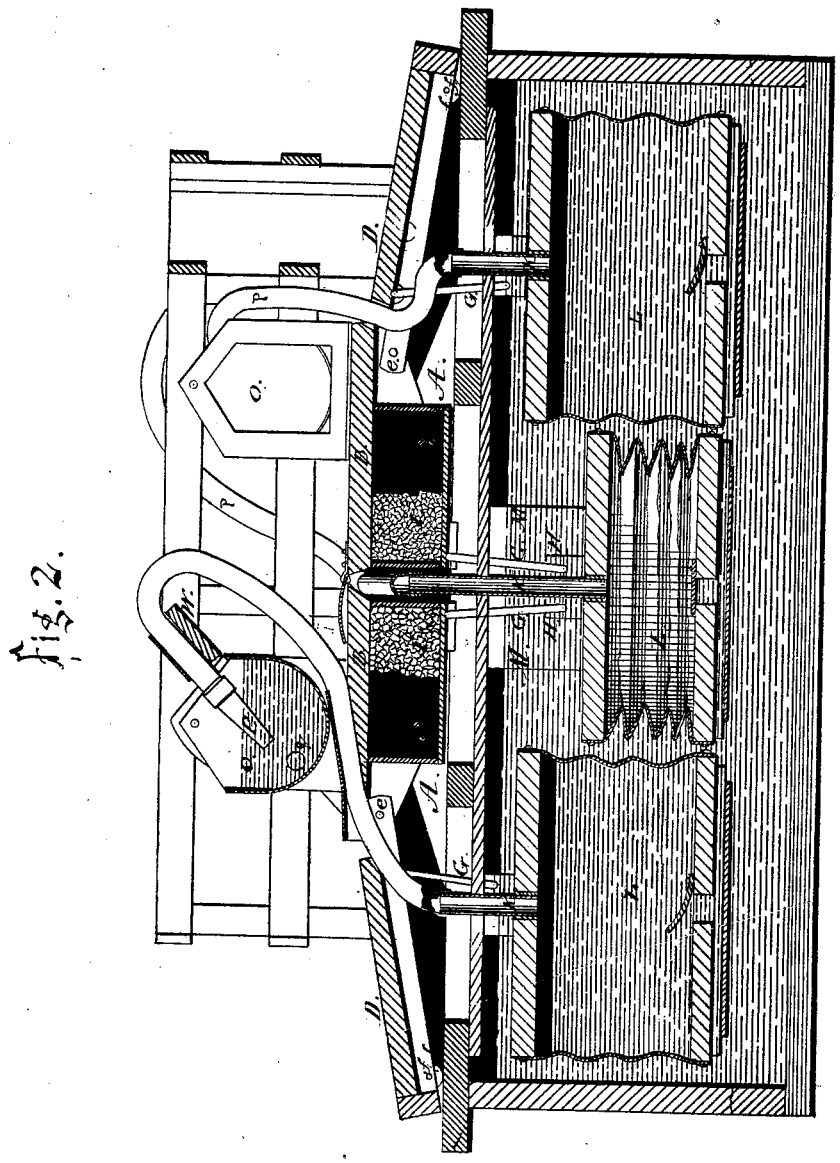

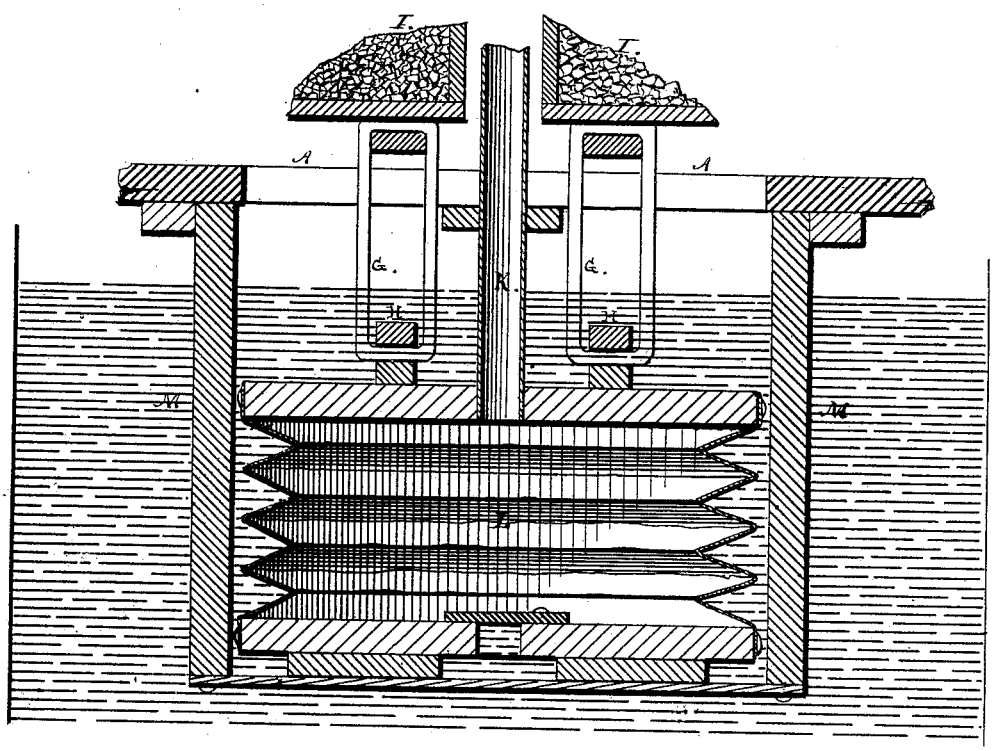

121,731

UNITED STATES PATENT OFFICE.

GILES BOLIVAR ROE, OF OGLE COUNTY, ILLINOIS.

IMPROVEMENT IN CATTLE-PUMPS.

Specification forming part of Letters Patent No. 121,731, dated December 12, 1871; antedated December 9, 1871.

*To all whom it may concern:*

Be it known that I, GILES BOLIVAR ROE, of the county of Ogle, in the State of Illinois, have invented certain Improvements in Water-Elevators, of which the following is a specification:

The nature of my invention consists in combining two or more pivoted platforms, provided with suitable counter or dead weights, in such a manner that the combined weight of animal and counter-weight can be used to elevate the water; also, in attaching a pump or any other suitable device for elevating water to the counter-weight so that when the weight is relieved from the pressure of the animal it will act upon the pump and raise any graduated quantity.

Figure 1 is a plan view of my invention. Fig. 2 is a section on the line *x x*. Fig. 3 is a section of one of the drums. Fig. 4 is a plan view of the platforms, certain portions, shown in Fig. 1, being removed.

A represents the sills, placed on opposite sides of the reservoir. B B are the counter or dead-weight platforms, having their outer ends pivoted to the platforms D at *e*, and their inner ones resting upon the links G, whereby they are connected to the drum L placed in the reservoir beneath. D D are the tram-platforms, having their outer ends resting upon the rollers *f f*, and their inner ones pivoted to the platforms B B in such a manner that when an animal walks upon the platform D its weight shall cause the counter-weight to rise to any graduated height. Placed in the platforms B are the weights I for the double purpose of depressing the drum L so as to raise water and to raise the platforms D after having been depressed by an animal, thereby inflating the drum attached to each one of them through the links G. Extending upward from each drum L is a pipe, K, through which the water is elevated, and to the upper ends of which are connected suitable pipes or hose P for conveying the water to the tanks or drinking-troughs O. Placed in the reservoir around each drum L are the inclosing cases or stays M, having the drums securely attached to their bottoms while their upper ends are secured to the sills A. Pivoted on top of each dead-weight platform, as shown in Figs. 1 and 2, are the self-adjusting water-tanks O, each of which is connected to the large water-trough T by the pipes *q*. The trough T should be large enough to allow the large animals in yard R to drink, and should also extend through into the yard or pasture S, where the small animals are kept. Extending from the bottom of the trough T back into the well is a pipe, V, so as to keep the trough drained and thereby prevent waste or freezing. *n* is a fence, passing over the right platform D so as to serve as a guide to the animals in passing to and from the water-trough T. X is a low guide fence, running alongside of the platforms so as to prevent the animals from getting on from the sides. Placed across the left platform B, just back of the water-box O, is another fence, W, so as to prevent the animals from passing over to the other platform so as to get to the second box O. Placed over the inner edges of the two platforms B is the tram-lid U, so as to cover the opening caused by elevating the center ends of the platforms.

One mode of operating the water-driver is as follows: The center drum L is connected, as shown in Fig. 4; the right and left drums L L are detached from the platforms D D, and the left water-box O, and the left discharge-pipe P, and the right discharge-pipe, and the fencings W W, and the high guide-fence are all removed from the platforms; the right water-box O remains, as shown in Fig. 1, and the low guide-fence X is attached to the watering-yard R in such a manner that the animal is compelled to step upon each platform in going to and in returning from the watering-box T. The center discharge-pipe connects with the right water-box O, the connections as above described. The animal, in passing into watering-yard D to gain access to the watering-box T, steps first upon the left platform D and depresses it, which in turn elevates the platforms B B and thereby inflates the center drum L, and also depresses the right platform D. The animal continues to advance until it reaches the right water-box O, and while in the act of drinking therefrom its live weight is combined with the dead-weights I I and depresses the platforms B B with great power, which in turn depresses the center drum L and drives the water up through the center extension-pipe K and its discharge-pipe into the right water-box O, from which the animal drinks a small part, the most of the water passing through the pipe *q* into the watering-box T. The animal's thirst not being entirely quenched at the right water-box O, it passes next upon the right platform D and depresses it, which in turn elevates the platforms B B and inflates the center drum L. The animal, advancing, steps off the platform D into the watering-yard R to drink from the watering-box T; then the dead-weights I I depress the platforms B B, which in turn depresses the center drum L and drives the water up through the center extension-pipe K and its discharge-pipe P into the right water-box O, and then passes into the watering-box T by the discharge-pipe q, while the animal is drinking therefrom. The animal's thirst being quenched, it leaves the yard R to obtain food, and steps first upon the right platform D and depresses it, which in turn elevates the center platform B B, and thereby inflates the center drum L. The animal, advancing, steps next upon the platforms B B, combining its live weight with the dead-weights I I, which depress the platforms B B and thereby depress the center drum L, which in turn drives the water up through the center extension-pipe K and its discharge-pipe P into the right water-box O; the water is passed from the box O into the watering-box T by the discharge-pipe q. The animal, advancing, steps next upon the left platform D and depresses it, which in turn elevates the platforms B B and thereby inflates the center drum L. The animal, advancing, steps off the left platform D, and the dead-weights I I depress the center drum L and thereby drive the water up through the center extension-pipe K and its discharge-pipe P into the right water-box O. The water in the box O is passed into the watering-box T by the discharge-pipe q. Thus it will be seen that each animal that passes into the watering-yard R by the entrance across the platforms, lengthwise, elevates two distinct drafts of water—one by the dead-weights I I, and one by the dead-weights I I and the weight of the animal combined. The animal, in going out of the watering-yard R, elevates the same number of drafts of water as when going into the watering-yard R, and in the same manner, except that in going out it is not checked at the right box O, for, having its thirst quenched, it goes out leisurely and accomplishes the same result without checking; and thus each animal that passes into and out of the watering-yard R by this mode may not only water itself, but it may elevate a great amount of water for other purposes.

Another mode of operating the water-driver is as follows: The drums L L L are attached, as in Fig. 2. The low guide-fence X is attached to the watering-yard R in such a manner that the animal is compelled to step upon each platform in going to and in returning from the watering-box T. The water-boxes O O are removed and the discharge-pipes P P P are connected to the watering-box T; then, the dead-weights I I being removed, the animal, in passing to the watering-box T, steps first upon the left platform D and depresses the platforms D D, which in turn elevates the platforms B B and inflates the center drum L. The depressing of the platforms D D also depresses the right and left drums L L and drives the water up through the right and the left extension-pipes K K and their discharge-pipes P P into the watering-box T. The animal, advancing, steps next upon the platforms B B and depresses them, and thereby depresses the center drum L and drives the water up through the center extension-pipe K and its discharge-pipe P into the watering-box T. The depressing of the platforms B B also elevates the platforms D D, and thereby inflates the left and the right drums L L. The animal steps next upon the right platform D and depresses the platforms D D, which in turn depresses the left and the right drums L L and thereby drives the water up through the right and the left extension-pipes K K and their discharge-pipes P P into the watering-box T. The animal, advancing, steps off the right platform D into the watering-yard R and drinks from the watering-box T. Its thirst being quenched, the animal leaves the watering-yard R to obtain food, and steps first upon the right platform D and depresses the platforms D D, which in turn elevates the platforms B B and inflates the center drum L. The depressing the platforms B B also depresses the right and the left drums L L, which in turn drives the water up through the right and the left extension-pipes K K and their discharge-pipes P P into the watering-box T. The animal, advancing, steps next upon the platforms B B and depresses them, which in turn elevates the right and the left platforms D D, and also inflates the right and the left drums L L. The depressing of the platforms B B also depresses the center drum L, and thereby drives the water up through the center extension-pipe K and its discharge-pipe P into the watering-box T. Advancing, the animal steps next upon the left platform D and depresses the platforms D D, which in turn elevates the platforms B B and inflates the center drum L. The depressing the platforms D D also depresses the right and the left drums L L, and thereby drives the water up through the right and the left extension-pipes K K and their discharge-pipes P P into the watering-box T. Advancing, the animal steps off the platform and goes whither it chooses to obtain food. Thus it will be seen that animals, in going to and returning from the watering-yard R, as by the fourth mode of operating the water-drivers, elevate a large amount of water, a small part of which they drink, and the balance may be used for other purposes.

Another mode of operating the water-driver is as follows: The drums L L L are connected to the platform, as shown in Fig. 2. The fencings and the water-boxes are removed from the platforms, and the discharge-pipes are centered in one general discharge-pipe, and the dead-weights I I are removed. Then heavy animals are led or driven across the platforms, passing first upon the left platform D and depressing the platforms D D, which in turn elevates the platforms B B and inflates the center drum L. The depressing the platforms D D also depresses the right and the left drums L L, which in turn drives the water up through the right and the left extension-pipes K K and their discharge-pipes P P into and through the general discharge-pipe. The animals are next led or driven upon the platforms B B and depress them, which in turn elevates the platforms D D and inflates the right and the left drums L L. The depressing of the platforms B B also depresses the center drum L and thereby drives the water up through the center extension-pipe K and its discharge-pipe P into and through the general discharge-pipe. The animals are next led or driven upon the right platform D and depress the platforms D D, which in turn elevates the platforms B B and inflates the center drum L. The depressing of the platforms D D also depresses the right and the left drums L L, and thereby drives the water up through the right and the left extension-pipes K K and their discharge-pipes P P into and through the general discharge-pipe. The animals are next led or driven off the right platform D. Thus it will be seen that the water-driver will elevate five distinct drafts of water by the animals being led or driven across the platforms; but in passing across the platforms after the first time, by this mode, the water-driver will elevate only three distinct drafts of water, from the fact that, when the animals are led or driven off the platforms D D, the right and the left drums L L will be depressed and will not be inflated again until the animals are led or driven upon the platforms B B. To increase the power and the capacity of the water-driver loaded vehicles may be attached to the animals when led or driven across the platforms, as herein above described.

Another mode of operating the water-driver is as follows: The center drum L is connected, as shown in Fig. 2; the right and the left drums L L are detached from the platforms D D; the dead-weights I I are placed in the platforms B B, as shown in Fig. 2; the fencings and the water-boxes O O, and the right and the left discharge-pipes P P, are all removed; then heavy animals are driven or led across the platforms. The animals being driven or led upon the left platform D they depress it, which in turn elevates the platforms B B, and thereby inflates the center drum L. The animals are next driven or led upon the platforms B B, and their weight is combined with the dead-weights I I, which depresses the platforms B B with great power, which in turn depresses the center drum L, and thereby drives the water up with great force through the center extension-pipe K and its discharge-pipe P, for general purposes. The animals are next driven or led upon the right platform D and depress the right and the left platforms D D, which in turn elevate the platforms B B, and thereby inflate the center drum L. The animals are next driven or led off the right platform D; then the dead-weights I I depress the platforms B B, which in turn depress the center drum L, and thereby drive the water up through the center extension-pipe K and its discharge-pipe P. Thus it will be seen that each time the animals are led or driven across the platforms of the water-driver as by the sixth mode of operating the water-driver, that the water-driver elevates two distinct drafts of water, one by the dead-weights I I, and one by the dead-weights I I and the weight of the animals combined. To increase the power and the capacity of the water-driver loaded vehicles may be attached to the animals when driven or led across the platforms, as herein above described. To gauge the platforms for light animals to do heavy elevating, the pivot-bolts $e\ e$ are placed nearer to the dead-weights I I; and for heavy animals to do light elevating, the pivot bolts $c\ c$ are placed further from the dead-weights I I.

The drum L is composed of an upper and a lower head on the top, and in the center of the lower head is a receiving valve; upon the top of the upper head there is a pipe thimble; inside of this thimble, upon the top head, there is a check-valve, to prevent water or air from passing back into the drum. The sides or body of the drum are made of vulcanized rubber packing, or its equivalent, in the shape as shown in Fig. 3, the joints securely secured by cementing, riveting, and sewing. This drum is submerged, to increase power and to dispense with suction, to add to its durability and to steady its motions, and to prevent the water from freezing therein.

I claim as my invention—

1. The platforms B and D, so arranged that the dead-weights I and the weight of the animal, or a moving weight, may be combined to elevate water, substantially as described.

2. The dead-weights I, combined with a suitable water elevator in such a manner that their weight may be used for raising water, substantially as set forth.

3. The drums L, pipes K, platforms B and D, water-troughs O and T, and pipes P, when all are combined to form a cattle-pump, as specified.

GILES BOLIVAR ROE.

Witnesses:
M. GARDNER,
EDW. W. DONN.

(118)